(12) United States Patent
Ozawa et al.

(10) Patent No.: US 6,347,823 B1
(45) Date of Patent: Feb. 19, 2002

(54) VEHICLE FRONT END PANEL WITH HORN COVER

(75) Inventors: Ikuo Ozawa, Toyoake; Norihisa Sasano, Ama-gun; Noriaki Maeda; Toshiki Sugiyama, both of Kariya; Isao Hara; Yoshihiro Suguro, both of Kosai; Takuya Usami, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/692,079

(22) Filed: Oct. 19, 2000

(30) Foreign Application Priority Data

Oct. 20, 1999 (JP) .............................................. 11-298496
Mar. 15, 2000 (JP) .......................................... 12-077832

(51) Int. Cl.<sup>7</sup> ............................................... B62D 25/08
(52) U.S. Cl. ..................... 296/1.1; 296/203.02; 296/194
(58) Field of Search ........................... 296/194, 203.02, 296/1.1; 180/684

(56) References Cited

U.S. PATENT DOCUMENTS 4,412,593 A * 11/1983 Taira ......................... 180/68.6

FOREIGN PATENT DOCUMENTS

JP          A-9-290770          11/1997

\* cited by examiner

*Primary Examiner*—Stephen T. Gordon
*Assistant Examiner*—Patricia Engle
(74) *Attorney, Agent, or Firm*—Harness, Dickey & Pierce, PLC

(57) ABSTRACT

In a vehicle front end panel, a horn cover for defining a passage of sound generated by a horn is formed integrally with a panel body to which a front end member such as a radiator is assembled. Further, the panel body and at least a part of the horn cover are integrally molded by resin. Therefore, the horn structure including the horn and the horn cover is readily manufactured in a low cost.

22 Claims, 5 Drawing Sheets

FIG. 2
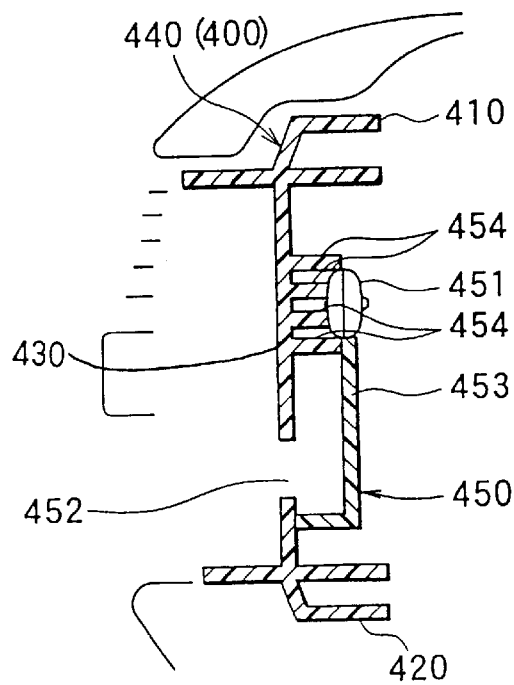
UP / FRONT ← → REAR / DOWN
FIG. 3
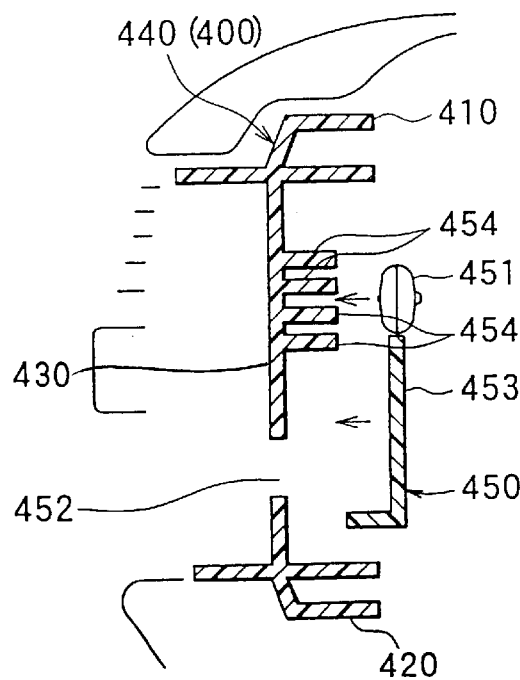
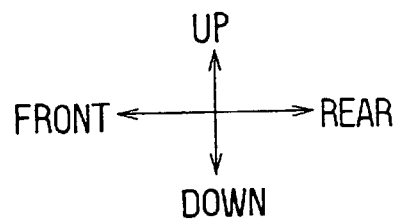
UP / FRONT ← → REAR / DOWN

VEHICLE FRONT END PANEL WITH HORN COVER

CROSS-REFERENCE TO RELATED APPLICATION

This application is related to and claims priority from Japanese Patent Applications No. Hei. 11-298496 filed on Oct. 20, 1999, and No. 2000-77832 filed on Mar. 15, 2000, the contents of which are hereby incorporated by reference.

BACKGROUND OF THE INVENTION

1. Field of the Invention

The present invention relates to a vehicle front end panel to which a radiator, a headlight, a horn (Klaxon) and the like are assembled.

2. Description of Related Art

As shown in FIG. 9, a conventional trumpet horn structure has a horn cover 50 forming a passage of sound generated by a horn 51, so that sound effect from the horn 51 is improved by an amplifying effect of the horn cover 50. However, because the separately formed horn cover 50 is necessary to form the sound passage, the number and manufacturing steps of vehicle front end components are increased, and the cost thereof is increased.

SUMMARY OF THE INVENTION

In view of the foregoing problems, it is an object of the present invention to provide a front end panel with a horn cover which is readily manufactured in a low cost.

According to the present invention, in a vehicle front end panel having a panel body assembled to a vehicle front end side, a horn cover is provided for defining a passage of sound generated by a horn, and the panel body and at least a part of the horn cover are integrally molded to be integrally formed. Therefore, assembling steps of horn structure becomes simple, and the horn structure including the horn and the horn cover is readily manufactured in a low cost.

Preferably, the panel body and the horn cover are integrally molded by resin. Therefore, the vehicle front end panel with the horn cover can be readily manufactured in a low cost.

In the front end panel, the panel body has a rear side portion facing toward a vehicle rear side, and the horn cover is provided so that the horn is positioned at the rear side portion. Therefore, the horn can be protected from rain water or a flying pebble during a vehicle travelling or the like.

Preferably, the horn cover has an outlet opening from which sound generated by the horn is transmitted to an outside through the passage, and the outlet opening is opened in the horn case toward a vehicle front side. Therefore, the effect of sound from the horn can be improved.

More preferably, the outlet opening is opened in the horn case in an axial direction of the passage defined by the horn cover. Therefore, the horn cover can be readily integrally molded with the panel body.

BRIEF DESCRIPTION OF THE DRAWINGS

Additional objects and advantages of the present invention will be more readily apparent from the following detailed description of preferred embodiments when taken together with the accompanying drawings, in which:

FIG. 2 is a cross-sectional view taken along line II—II in FIG. 1;

FIG. 3 is a cross-sectional view corresponding to FIG. 2, before a cover member is assembled;

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to 1–3. In the first embodiment, the present invention is typically applied to a vehicle where a radiator for cooling engine-cooling water, a condenser of a refrigerant cycle, and a blower unit for blowing cooling air toward the radiator and the condenser are mounted on a vehicle front end portion.

Figure 1:
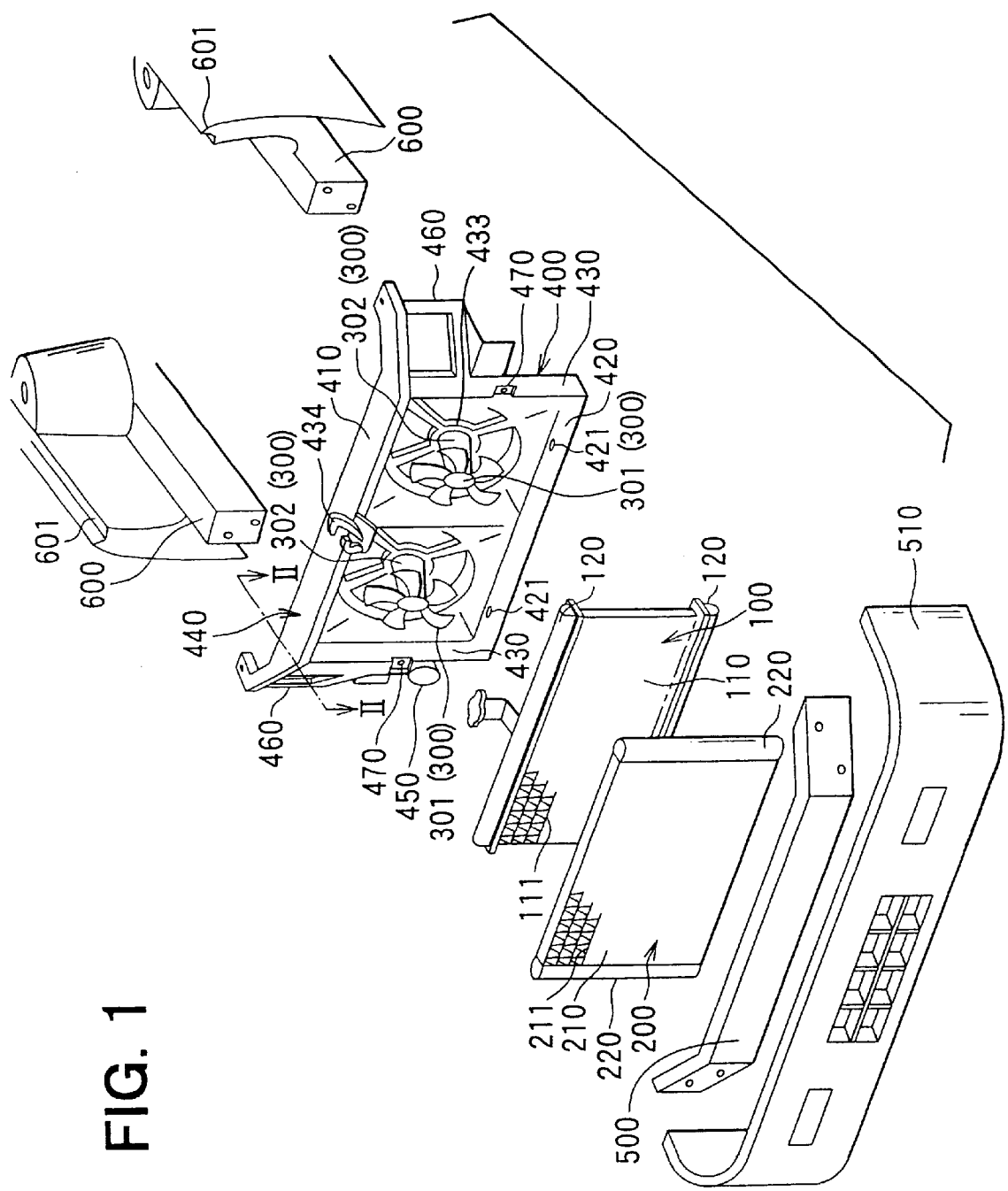
FIG. 1 is a disassembled perspective view of a vehicle front end structure with a front end panel according to a first preferred embodiment of the present invention.

As shown in FIG. 1, a radiator 100 is disposed at a vehicle rear side of a condenser 200, and a blower unit 300 composed of a blower fan 301 and an electrical motor 302 for driving the blower fan 301 is disposed at a vehicle rear side of the radiator 100.

The radiator 100 includes a radiator core 110 having plural radiator tubes 111 through which cooling water flows, and both radiator tanks 120 connected to both ends of each radiator tube 111 in a longitudinal direction of the radiator tubes 111 to communicate with each radiator tube 111. Similarly, the condenser 200 includes a condenser core 210 having plural condenser tubes 211 through which refrigerant flows, and both condenser tanks 220 connected to both ends of each condenser tube 211 in a longitudinal direction of the condenser tubes 211 to communicate with each condenser tube 211.

A front end member such as the radiator 100, the condenser 200 and the blower unit 300 is assembled to a front end panel 400 made of resin. The front end panel 400 includes a panel body 440 and a shroud 433 integrated to each other. The panel body 440 includes an upper beam 410 provided at an upper side to extend in a horizontal direction, a lower beam 420 provided at a lower side to extend in the horizontal direction, and both right and left supporting pillars 430 extending in a vertical direction to connect both the upper and lower beams 410, 420. The shroud 433 integrated with the panel body 440 is disposed to support the electrical motor 302 of the blower unit 300, and to prevent an air suction from a downstream air side of the radiator 100. A hood lock 434 for fixing an engine hood (bonnet) is attached to the upper beam is 410 as shown in FIG. 1.

A bumper 500 (buffer member) made of a metal is covered by a bumper cover 510 made of a resin. The bumper 500 and the front end panel 400 are fixed to vehicle side bodies 600, 601 by a fastening member such as a bolt.

A horn cover 450 for covering a horn 451 described later is integrally formed with the left supporting pillar 430 to be opened to a vehicle front side, as shown in FIG. 1. Both light attachment portions 460 for attaching headlights (not shown) are formed in the right and left supporting pillars 430, respectively, to have a rectangular frame shape. Further, sensor attachment portions 470 for attaching sensors such as a vehicle speed sensor and an outside air temperature sensor are right-left symmetrically formed in the supporting pillars 430.

Further, attachment holes 421 for fixing the radiator 100 are provided in the upper and lower beams 410, 420. On the other hand, pin portions (not shown) are provided in the radiator 100 to correspond to the attachment holes 421. By inserting the pin portions of the radiator 100 into the attachment holes 421 of the front end panel 400, the radiator 100 is fixed to the front end panel 400. The condenser 200 is assembled to the radiator 100 to be fixed to the radiator 100 by using a fastening member such as a bolt through a stay.

As shown in FIG. 2, the horn 451 (Klaxon) that is a sound source for generating warning sound is assembled to a position of the panel body 440 of the front end panel 400, facing toward a vehicle rear side. The horn cover 450 is integrally formed with the panel body 440 of the front end panel 400 at a position facing toward a vehicle rear side to define a passage of sound generated by the horn 451. The horn cover 450 is formed to have an outlet opening 452 opened toward a vehicle front side, so that a sectional area of the passage of sound is increased from the horn 451 toward the outlet opening 452.

In the first embodiment, among the horn cover 450, a wall portion 454 for defining a trumpet passage of sound and a wall part defining the outlet opening 452 are integrally molded with the panel body 440. Further, as shown in FIG. 3, a cover member 453 made of resin is integrally assembled to the panel body 440 from a vehicle rear side by melt-bonding or by using an adhesive, so that the horn cover 450 is constructed.

According to the first embodiment, because at least a part of the horn cover 450 defining a trumpet sound passage is integrally molded with the panel body 440 by resin, the trumpet horn structure can be readily formed. Therefore, the number of components and the assembling steps of the trumpet horn structure can be decreased, and the trumpet horn structure is manufactured in a low cost. Further, because trumpet sound passage is defined by the horn cover 450, sound generated by the horn 451 is not directly linearly transmitted to the outlet opening 452, but is transmitted to the outlet opening 452 to be turned within the horn cover 450. In the first embodiment, the wall portions 5454 are disposed to form a swirl sound passage so that sound generated by the horn 451 is transmitted to the outlet opening 454 after being turned in a swirl like.

In the first embodiment of the present invention, because the horn cover 450 defining the trumpet sound passage is formed integrally with the panel body 440, the horn 451 can be positioned at a vehicle rear side of the condenser 200, and is not troubled by rain or an exterior subject such as a flying pebble or the like. Therefore, the horn 451 can be protected without using a seal structure.

As an attachment position of the horn 451, a position on a rear side portion of the panel body 440 at an approximate center position in the up-down direction is selected. Because the horn 451 is disposed on the rear side position of the panel body 440, facing a vehicle rear side, the horn 451 can be protected from rain or an exterior subject such as a flying pebble or the like in a vehicle travelling state. Further, because the horn 451 is disposed in the supporting pillar 430 at an approximate center position in the up-down direction, the upper and lower beams 410, 420 are used as protection eaves, and the horn 451 can be protected from rain falling from an upper side and from scattering rain water or flying pebble from a road surface.

Further, because the outlet opening 452 of the horn cover 450 is opened toward a vehicle front side, warning sound can be readily transmitted to a vehicle front side regardless of the attachment position of the horn 451, and the effect of warning sound is improved. The tone quality of the warning sound can be adjusted by adjusting a passage length, a passage sectional area, a change degree of the passage sectional area and the like of the horn cover 450.

A second preferred embodiment of the present invention will be now described with reference to FIGS. 4–6. In the above-described first embodiment, because the outlet opening 452 is opened in a direction approximately perpendicular to an axial direction of a sound passage defined by the horn cover 450, all the horn cover 450 is difficult to be integrally molded with the panel body 440 of the front end panel 400. Therefore, in the above-described first embodiment, the cover member 453 is assembled to the horn cover 450 to form the sound passage.

Figure 4:
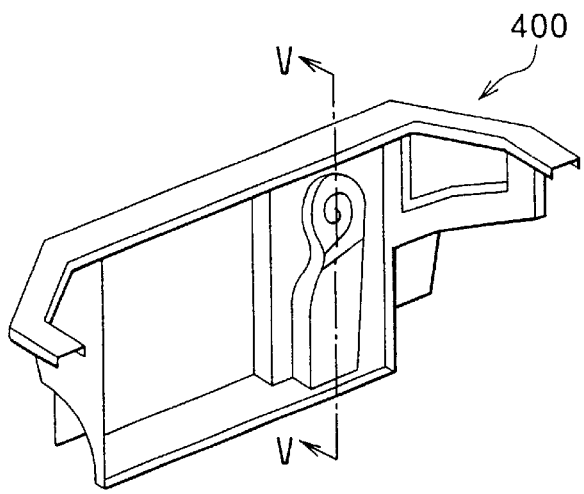
FIG. 4 is a perspective view showing a rear side surface of a front end panel according to a second preferred embodiment of the present invention.
Figure 5:
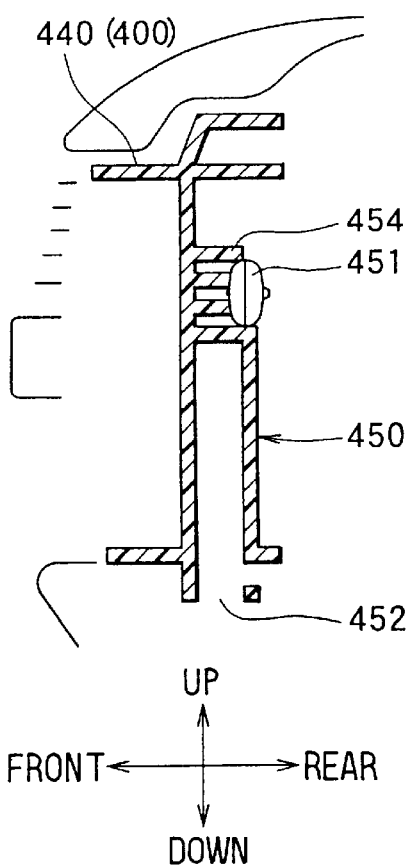
FIG. 5 is a cross-sectional view taken along line V—V in FIG. 4.
Figure 6:
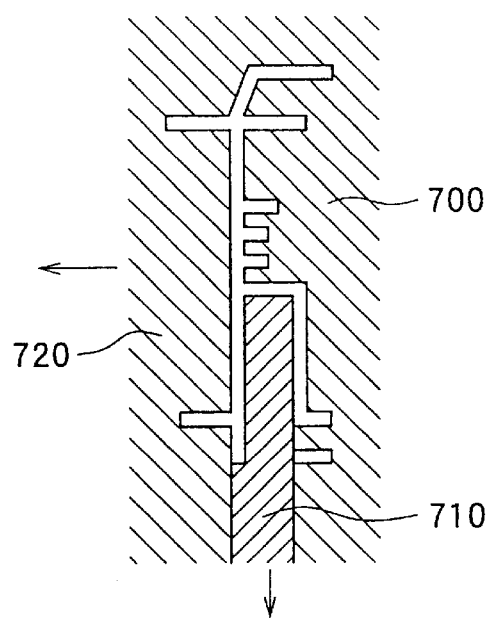
FIG. 6 is a schematic view of a molding die for the front end panel according to the second embodiment.

In the second embodiment, as shown in FIGS. 4 and 5, the outlet opening 452 is opened toward a lower side in the axial direction of the sound passage defined by the horn cover 450. Therefore, the horn cover 450 can be readily integrally molded with the panel body 440 of the front end panel 400 using molding dies 700–720 shown in FIG. 6. That is, a trumpet sound passage can be readily formed by the integrally molded panel body 440 without assembling a separated member. The molding die 710 shown in FIG. 6 is a slide type.

In the above-described second embodiment, the outlet opening 452 is provided toward a lower side. However, in the second embodiment, if only the outlet opening 452 is opened toward in the axial direction of the sound passage defined by the horn cover 450, the outlet opening 452 can be opened toward any side, for example, a vehicle side body side or an upper side of the vehicle.

A third preferred embodiment of the present invention will be now described with reference to FIGS. 7 and 8. In the third embodiment, components similar to those of the above-described first embodiment are indicated with the same reference number. In the above-described first and second embodiment, the horn cover 450 and the horn 451 are provided to form the swirl sound passage. However, in the third embodiment, the horn cover 450 is formed into a cylinder shape having a closed bottom surface at a vehicle rear side, and horn 451 is attached to the bottom surface. Therefore, a tone quality and a sound pressure of the warning sound generated by the horn 451 are readily adjusted by adjusting resonance frequency of the horn cover 450. In the third embodiment, the resonance frequency of the horn cover 450 is adjusted by adjusting an inner diameter D of the horn cover 450, a height L (i.e., the dimension from an opened surface to the bottom surface) of the horn cover 450 and a wall thickness t of the horn cover 450, as shown in FIG. 8.

Figure 8:
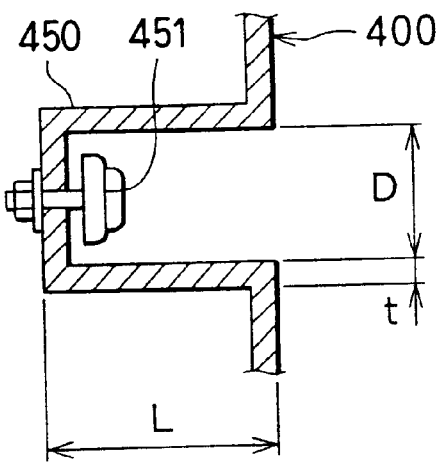
FIG. 8 is a cross-sectional view taken along line VIII—VIII in FIG. 7.
Figure 9:
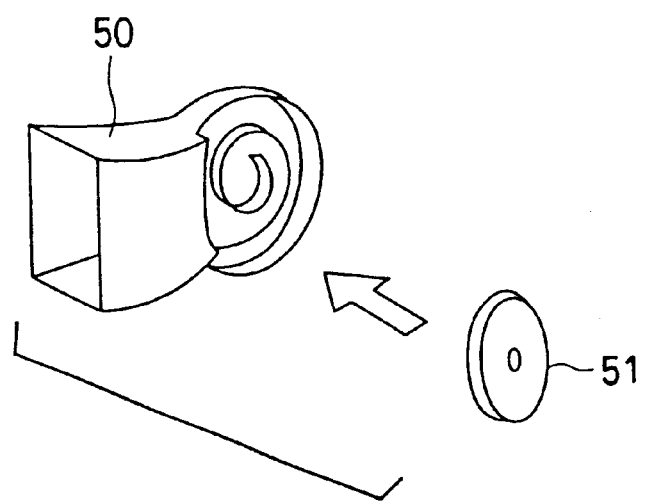
FIG. 9 is a perspective view of a conventional trumpet horn structure.

In the third embodiment, as shown in FIG. 8, the horn cover 450 is formed integrally with the front end panel 400. That is, the horn cover 450 is integrally molded with the panel body 440 of the front end panel 400. Therefore, by changing a shape of a part of a molding die, forming the horn cover 450, the inner diameter D, the height L and the wall thickness t of the horn cover 450 can be readily changed, so that the tone quality and the sound pressure of the warning sound generated by the horn 451 can be readily adjusted.

In the third embodiment, as shown in FIG. 8, the horn cover 450 is formed integrally with the front end panel 400. That is, the horn cover 450 is integrally molded with the panel body 440 of the front end panel 400. Therefore, by changing a shape of a part of a molding die, forming the horn cover 440, the inner diameter D, the height L and the wall thickness t of the horn cover 450 can be readily changed, so that the tone quality and the sound pressure of the warning sound generated by the horn 451 can be readily adjusted.

Figure 7:
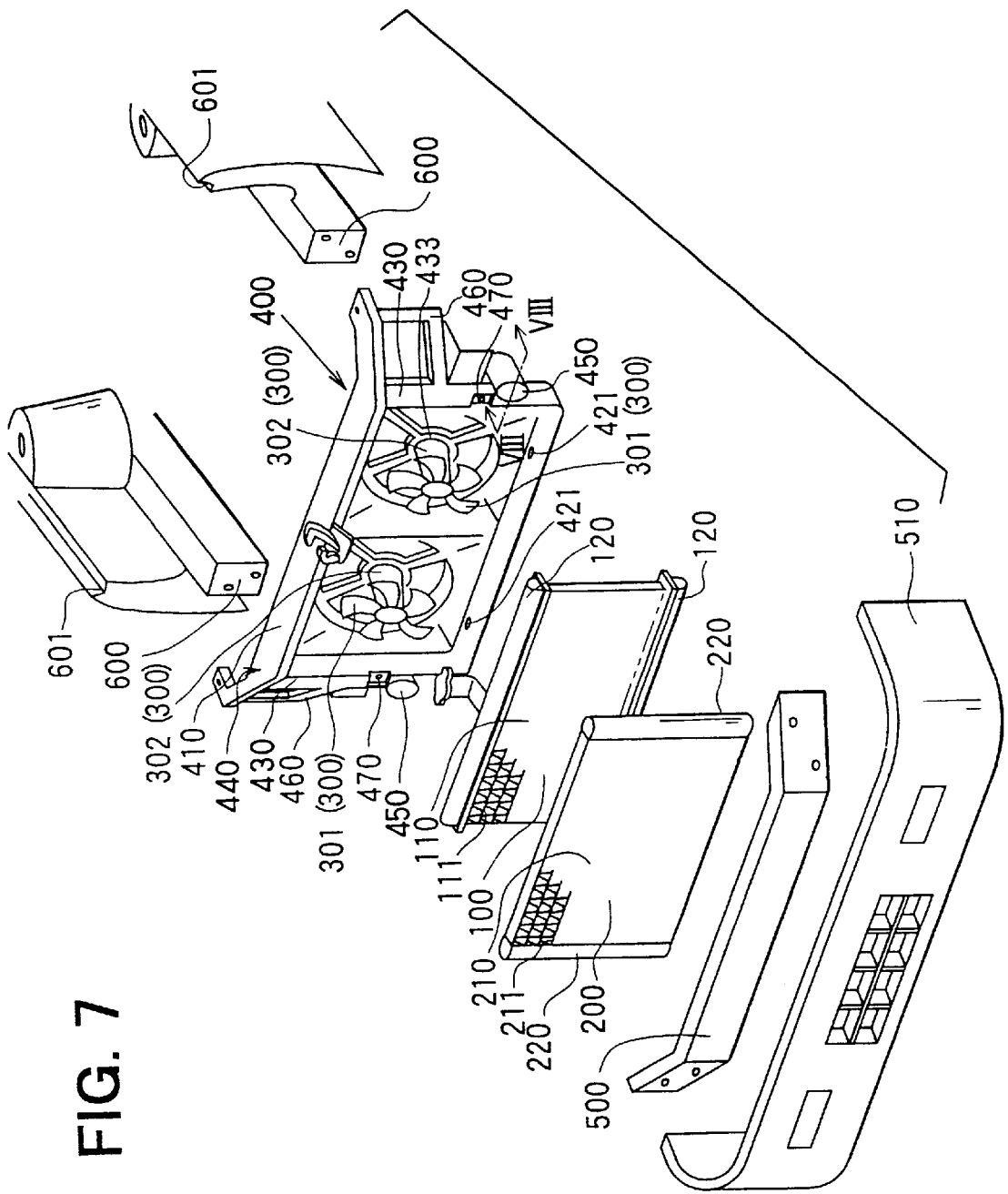
FIG. 7 is a disassembled perspective view of a vehicle front end structure with a front end panel according to a third preferred embodiment of the present invention.

Further, in the third embodiment, as shown in FIG. 7, similarly to the light attachment portions 460 and the sensor attachment portions 470 described in the embodiment, both the horn covers 450 are integrally formed with the right and left supporting pillars 430, respectively, to be right and left symmetrical. Generally, the horn 451 and the sensors are provided to a driver's seat side at which a damage of the horn 451 and the sensors are difficult to be received. In the third embodiment, because both the horn covers 450 and both the sensor attachment portions 470 are right-left symmetrically formed integrally with the front end panel 400, the front end panel 400 can be used for a vehicle having a right steering wheel and for a vehicle having a left steering wheel. Accordingly, the attachment positions of the horn 451 and the sensors are readily changed relative to different positions of the steering wheel in a vehicle.

Further, in the front end panel 400, the upper beam 410, the lower beam 420, the right and left supporting pillars 430, the shroud 433, the horn covers 450, the light attachment portions 460 and the like are integrally formed by resin, at the same time. Therefore, the front end panel 400 can be readily manufactured in a low cost. In the third embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described embodiments of the present invention, the front end panel 400 is made of a resin; however, may be made of the other material such as a metal. In the above-described embodiments, the front end panel 400 and at least a part of the horn cover 450 are integrally molded by resin. However, the front end panel 400 and the horn cover 450 may be integrally bonded by a melting or an adhesive, after being separately formed from each other.

In the above-described third embodiment of the present invention, the horn cover 450 is formed into a cylinder shape; however, may be formed into the other shape such as a pipe like. In the above-described third embodiment of the present invention, both the horn covers 450 are right-left symmetrically disposed in the panel body 440; however, may be disposed at the other positions in the panel body 440.

Such changes and modifications are to be understood as being within the scope of the present invention as defined by the appended claims.

What is claimed is:

1. A front end panel of a vehicle comprising:
   a panel body assembled to a vehicle front end side, to which a front end member mounted on the vehicle front end side is attached; and
   a horn cover member, to which a horn is attached, wherein:
      said panel body has a wall member integral with said horn cover member; and
   said wall member and said horn cover member are disposed to construct a horn cover defining a passage of sound generated by said horn.

2. The front end panel according to claim 1, wherein said wall member and at least a part of said horn cover member are integrally molded by resin.

3. The front end panel according to claim 1, wherein:
   said horn cover has an outlet opening from which sound generated by said horn is transmitted to an outside through said passage; and
   said outlet opening is provided in said wall member to be opened toward a vehicle front side.

4. The front end panel according to claim 1, wherein:
   said horn cover has an outlet opening from which sound generated by said horn is transmitted to an outside through said passage; and
   said outlet opening is opened in said horn case in an axial direction of said passage defined by said horn cover.

5. The front end panel according to claim 1, wherein said passage of said horn cover is provided so that sound generated by said horn is transmitted to an outside after being turned within said horn cover.

6. The front end panel according to claim 1, wherein said passage of sound has a swirl shaped part.

7. The front end panel according to claim 1, wherein said passage of sound is provided in such a manner that a sectional area is increased from said horn toward an outlet opening of said horn cover.

8. The front end panel according to claim 1, wherein said horn cover is formed into a cylinder shape.

9. The front end panel according to claim 8, wherein:
   said horn is attached to a bottom surface of the cylinder shape of said horn cover, at a vehicle rear side; and
   said horn cover has an opening opened toward a vehicle front side.

10. The front end panel according to claim 1, wherein both said horn covers are provided in said panel body at both right and left positions to be right-left symmetrical in the vehicle.

11. The front end panel according to claim 1, wherein said front end member includes at least a radiator for cooling an engine-cooling water.

12. The front end panel according to claim 1, wherein:
   said panel body includes upper beam member extending horizontally at a vehicle upper side, a lower beam member extending horizontally at a vehicle lower side, and right and left supporting pillars extending vertically to connect said upper beam member and said lower beam member;
   said front end member is attached to said upper beam member and said lower beam member; and
   said wall member is one of said right and left supporting pillars.

13. The front end panel according to claim 1, wherein said passage defined by said horn cover has a trumpet shape.

14. The front end panel according to claim 1, wherein:
   said horn cover member is disposed at a vehicle rear side of said wall member of said panel body; and
   said horn is disposed at a vehicle rear side position in the horn cover.

15. The front end panel according to claim 1, wherein:

said horn cover member includes a plurality of protrusion walls protruding from said wall member of said panel body approximately vertically relative to a wall surface of said wall member; and said horn is disposed on protrusion top sides of said protrusion walls.

16. The front end panel according to claim 15, wherein said protrusion walls protrudes toward a vehicle rear side.

17. The front end panel according to claim 15, wherein:

said horn cover member further includes a plate member having a plate portion approximately parallel to said wall surface of said wall member;

one end of said plate member is connected to one protrusion end of said protrusion walls, at one side of said horn; and the other end of said plate member is coupled to the wall member.

18. The front end panel according to claim 17, wherein said plate portion is disposed to protrude from said one protrusion end of said protrusion walls.

19. The front end panel according to claim 1, wherein:

said horn cover has an outlet opening from which sound generated by said horn is transmitted to an outside through said passage;

said passage of said horn cover has a length from said horn to said outlet opening, and a sectional area; and said passage is provided in such a manner that a tone color of sound generated by said horn is adjusted by the length and the sectional area of said passage.

20. A front end structure of a vehicle, comprising:

a front end member including at least a radiator, said front end member being mounted on the vehicle at a vehicle front end side;

a front end panel to which said front end member is assembled;

a horn for generating a sound; and a horn cover member, to which said horn is attached, wherein:

said front end panel has a wall member integral with said horn cover member; and said wall member and said horn cover member are disposed to construct a horn cover defining a passage of sound generated by said horn.

21. The front end structure according to claim 20, wherein said wall member of said front end panel and at least a part of said horn cover member are integrally molded.

22. A front end panel of a vehicle, said front end panel comprising:

a panel body assembled to a vehicle front end side;

a horn cover defining a sound passage, said panel body and a portion of said horn cover forming a single piece homogeneous structure;

a horn attached to said horn cover, said horn operable to generate a sound directed towards said sound passage.

* * * * *